Aug. 4, 1936.  A. SEARS  2,049,519
SLICING MACHINE
Filed Aug. 24, 1934   2 Sheets-Sheet 1
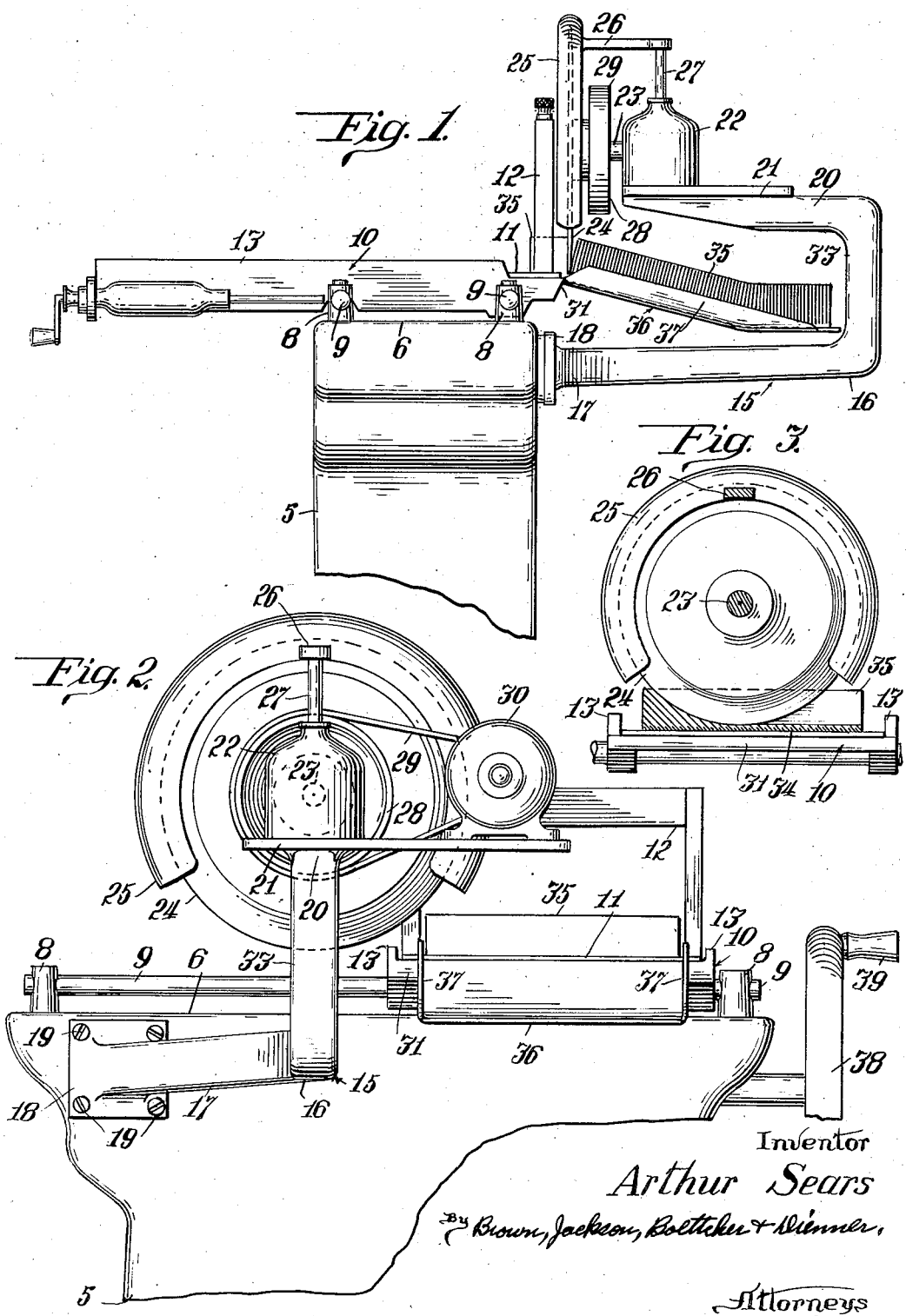
Inventor
Arthur Sears
By Brown, Jackson, Boettcher & Dienner,
Attorneys

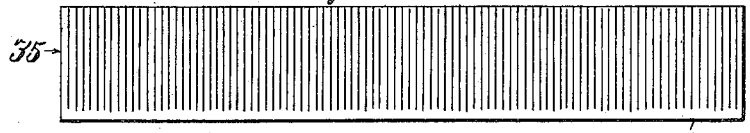
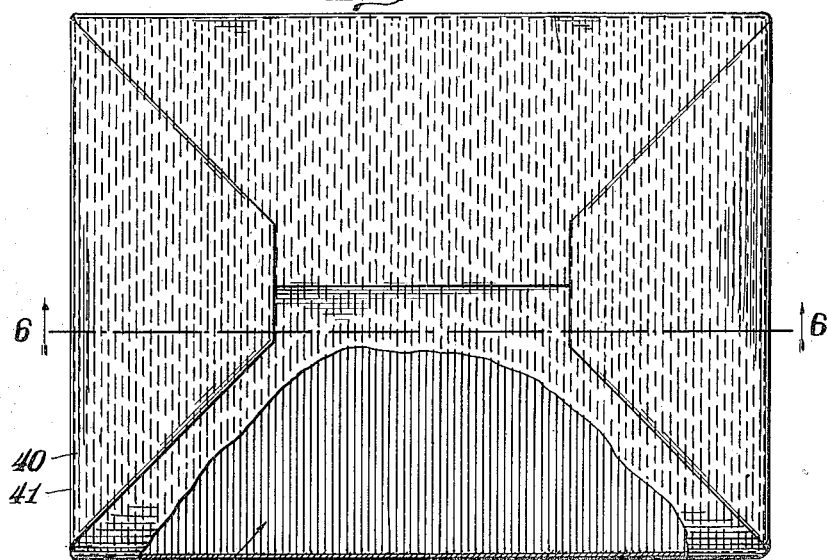
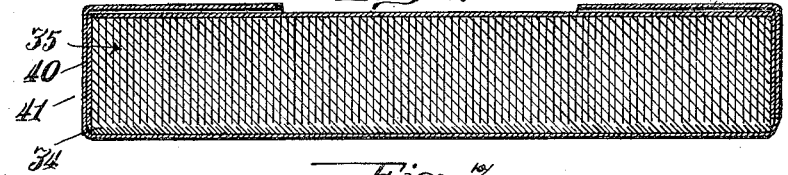
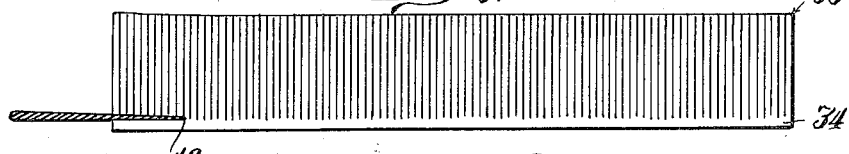
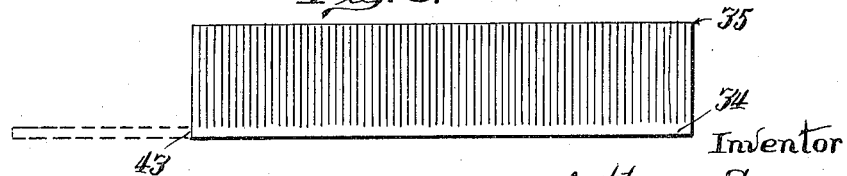

Patented Aug. 4, 1936

2,049,519

UNITED STATES PATENT OFFICE 2,049,519

SLICING MACHINE

Arthur Sears, Elkhart, Ind.

Application August 24, 1934, Serial No. 741,209

1 Claim. (Cl. 146—102)

This invention relates to slicing machines and the product thereof, and is more particularly concerned with machines for slicing bacon and the like.

Machines of the type to which this invention pertains commonly employ a transversely reciprocating table, which table is moved back and forth past the turning axis of a circular rotating knife for slicing bacon and the like, the reciprocatory table having a bacon carrier proper mounted thereon, which bacon carrier is fed forward in the course of and as a result of such reciprocation of the table, so that a slice of bacon of substantially uniform thickness will be cut in the course of each reciprocation.

Heretofore, in slicing a slab of bacon or the like, in machines of the type above described, it has been the practice to so locate the rotating knife with respect to the bacon carrier, and the slab of bacon to be sliced, that the knife passes entirely through the slab of bacon and thereby delivers a slice of bacon which is completely severed from the slab thereof, upon each reciprocation of the table.

It has now been found that the individual slices of bacon can be kept in better condition and can be more conveniently handled if such individual slices of bacon are not completely severed from the slab thereof.

This invention, therefore, has as one of its objects, the provision of a method of slicing bacon in such manner that the individual slices thereof will not be completely severed from the slab of bacon to be sliced. The method proposes the formation of transverse incisions or cuts in the slab of bacon, these cuts extending down to the rind only on the bottom of the slab of bacon, so as to leave the rind uncut. By so slicing the slab of bacon, the rind will serve to hold the individual slices of bacon snugly together, thereby protecting them from the atmosphere and making for more convenience in handling the slices.

After the slab of bacon is sliced in the manner above described, it is immediately enclosed in a wrapper. This wrapper may be formed of waxed paper, or the like, and serves to protect the slab of bacon itself from moisture and from the atmosphere, so that the wrapped bacon may be kept in good condition for a considerable extent of time. When it is desired to remove some of the slices of bacon from the slab, one end of the wrapper may be opened and the slab of bacon partially removed therefrom to permit of the removal of the desired number of slices, after which the slab may be pushed back into the wrapper and the wrapper instantly reclosed. Due to the grease and the juices contained in the bacon, the remaining slices of bacon will have sufficient adhesiveness to prevent unintentional separation thereof. Also, if the wrapper should be torn in the first opening thereof, the remaining slices of bacon can be handled as a unit while being enclosed in a new wrapper. It is the partial cutting of the slab of bacon down to the rind only which first facilities wrapping of the slab of bacon, as well as protecting the slices from the atmosphere, and then enables the user to remove some slices without disarranging others.

Another object of the invention, therefore, is to supply users with wrapped sliced bacon in such condition as to permit of any number of slices of bacon to be removed from the slab thereof without disarranging the remaining slices, and thereby reducing the liability of the remaining slices of bacon becoming affected by the atmosphere.

Still another object of the present invention resides in providing a slicing machine of the class above described with means for carrying out the above disclosed method of slicing bacon. Briefly, this means comprises a substantially U-shaped arm or bracket, one of the legs of which is secured to the base or pedestal of the slicing machine, and the other leg of which carries a plate for supporting the rotating knife and the driving means therefor. This arm or bracket is arranged to so dispose the rotating knife with respect to the bacon carrier that the knife will enter into and slice a slab of bacon on the carrier down to the rind only. Means is also provided for receiving the bacon as it is sliced by the knife, this means being secured to and carried by the reciprocating table.

The novel features which I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Figure 1 is a fragmentary side elevational view of a machine embodying the principles of the present invention;

Figure 2 is a fragmentary front elevational view of the machine shown in Figure 1;

Figure 3 is a view of the rotating knife and reciprocating table showing the extent of the cut made in a slab of bacon;

Figure 4 is a side elevational view of a slab of bacon which has been sliced in accordance with the principles of the present invention;

Figure 5 is a top plan view of a slab of sliced bacon enclosed in its wrapper;

Figure 6 is a vertical sectional view taken along the line 6—6 of Figure 5;

Figure 7 is a side elevational view of a slab of sliced bacon, showing the method by which the slices of bacon may be removed from the rind for use; and Figure 8 is a view similar to Figure 7, showing the method by which the rind which remains after some of the slices are removed therefrom, may be removed from the slab of bacon.

Referring now in detail to the drawings, the slicing machine of the present invention, for carrying out the method of slicing bacon as above disclosed, comprises a base or pedestal 5 having a flat rectangular upper surface 6 on which are rigidly secured studs 8. One of these studs is disposed at each of the four corners of the pedestal. The studs are paired in a direction transversely of the table and each one of the two pairs of studs has one end of a guide rod 9 rigidly secured thereto, these two guide rods extending parallel to each other and transversely of the pedestal 5. The guide rods are adapted to support a bed or table 10 thereon, this table having reciprocatory movement along the rods 9 and transversely of the pedestal 5 and of the turning axis of the rotating knife. The mechanism for imparting reciprocatory movement to table 10 forms no part of the present invention, and need not, therefore, be illustrated or described here. Such mechanism is known in the art and may be similar in construction and operation to that shown in patent No. 1,439,476, granted December 19, 1922, to F. H. Lippincott, for Table feeding mechanism for slicing machines.

Mounted upon table 10 is a small plate 11 which is adapted to support any suitable type of meat-clamping mechanism 12. This plate 11 is adapted to have a step-by-step forward movement longitudinally of table 10 and axially of the rotating knife. That is, upon each reciprocation of table 10, plate 11 moves one step forward towards the rotating knife and longitudinally of table 10. The mechanism for imparting this step-by-step movement to plate 11, likewise, forms no part of the present invention and need not, therefore, be either illustrated or described. Such mechanism may, however, be similar in construction and operation to the mechanism which is employed in the above-mentioned patent for moving the article-carrying table shown therein longitudinally of the reciprocating table.

Plate 11 of the present invention corresponds to the article-carrying table shown in the above mentioned patent. It will be noted, however, that in such patent the clamping mechanism is carried by the forward end of the table. The greater majority of the meat to be sliced, for example, a slab of bacon, is, therefore, carried back of the clamping mechanism and only a small portion of the bacon extends forwardly of the clamping mechanism. The result is that the slab of bacon can only be sliced up to the clamping mechanism, and it is then necessary to release the remaining portion of the slab of bacon from the clamping mechanism and to move it forwardly on the carrier to present another portion of bacon to be sliced.

In the present invention it is contemplated clamping the slab of bacon at its extreme rearward end, that is, the end most remote from the rotating knife. By so clamping the slab of bacon, the slab may be moved forwardly toward the rotating knife, and sliced thereby, in a continuous step-by-step movement, and without the necessity of readjusting the clamping mechanism at certain intervals. In the present case, when plate 11 and clamping mechanism 12 are disposed adjacent the rotating knife, substantially the entire slab of bacon will be sliced, the only portion remaining unsliced being the small portion which is clamped between plate 11 and clamping mechanism 12. To permit of the slab of bacon being clamped at its rearward end, the plate 11 has, therefore, been made only large enough to properly carry the clamping means 12. The forward end of the plate will not project into the path of the rotating knife when the clamping mechanism and the plate are disposed adjacent the knife. The longitudinal extent of the table 10 has been made approximately twice that of the reciprocatory tables now commonly employed, so as to accommodate a full-size slab of bacon and to permit of the clamping mechanism being pulled back far enough to be clamped to the rear end of the slab of bacon. The slab of bacon, in its forward movement toward the rotating knife, seats on table 10, and upturned flanges 13 formed on the sides of table 10 prevent lateral movement of the forward portion of the slab of bacon as it is being cut by the rotating knife.

The means for mounting the rotating knife on pedestal 5 comprises a substantially U-shaped bracket 15, one leg 16 of which has an offset portion 17. This offset portion 17 of leg 16 terminates in a substantially flat plate 18, by which the bracket 15 is secured to the front wall of pedestal 5, as by means of bolts 19, or in any other suitable or preferred manner. Leg 16 of bracket 15 extends outwardly from pedestal 5 a sufficient length to accommodate a slab of bacon therebetween and the reciprocatory table 10, while the leg 20 of bracket 15 is extended inwardly toward the table and has one end of a platform 21 rigidly secured to the upper surface thereof, in any suitable or preferred manner. This platform 21 supports a housing 22, in which is journaled the axle 23 of the rotating knife 24. The knife guard 25, disposed around the major portion of knife 24, is secured to and supported by housing 22, as by means of the arms 26 and 27, or in any other suitable or preferred manner. Knife 24 is driven by a pulley 28, secured to axle 23 of the knife, and a belt 29, which has connection with a pulley (not shown) on the shaft of an electric motor 30, which is also supported on and rigidly secured to platform 21.

Knife 24 is of the type having a peripheral cutting edge, and leg 20 of bracket 15 is of such length that it will dispose the cutting edge of the knife substantially over the terminating edge 31 of reciprocatory table 10. With the knife in such position, each slice of bacon, as it is partially severed from the slab of bacon, will bend downwardly and forwardly away from edge 31 of table 10 and thereby permit of the knife passing through the cut in the bacon, without danger of ripping or tearing of the bacon, when the reciprocatory table is moved back to its starting position.

As shown, the vertical portion 33 of bracket 15 is of such height that the rotating knife 24 will cut down to the rind 34, only, of the slab of bacon 35, but will not cut through the rind. As the slab of bacon is sliced or cut, it moves into a receiving tray 36. This tray is secured at one end to the forward edge 31 of table 10, in any suitable or preferred manner, and is adapted to reciprocate with the table. The tray extends downwardly and forwardly from table 10 and is inclined upwardly at its forward end. Flanges 37 formed on the sides of tray 36 serve to retain the sliced bacon thereon.

Referring now to Figure 1, in the operation of the machine the clamping mechanism 12 is pulled backwardly from knife 24 a sufficient distance to permit of seating a slab of bacon on table 10, and the rear end of the bacon is then clamped between plate 11 and clamping mechanism 12. Table 10 is then reciprocated by means of flywheel 38 and handle 39. In this connection, it may be stated that table 10 may also be power-driven. It is contemplated employing two separate motors, one for driving knife 24 and the other for driving table 10.

Reciprocation of table 10 will feed the slab of bacon toward knife 24, this knife making cuts or incisions in the bacon down to the bottom rind only, but not through the rind, due to the disposition of knife 24 with respect to the slab of bacon. As the bacon is sliced it moves forward into tray 36, and after the entire slab of bacon is sliced, table 10 may be moved to the right, as viewed in Figure 2, at which time tray 36 will be moved clear of transverse portion 33 of bracket 15, and the bacon may then be removed from the tray.

Figure 4 shows the slab of bacon 35 as it appears when completely sliced. This slab of bacon is then immediately enclosed in a paper wrapper 40, as shown in Figures 5 and 6. This wrapper may be waxed paper, or the like, and serves to protect the slab of bacon from moisture and from the atmosphere. As the slices of bacon are held together by the rind, the wrapping of the slab of bacon will be greatly facilitated thereby. Also, as the rind holds the slices of bacon closely together, thereby preventing entrance of atmosphere therebetween, and as the wrapper protects the slab of bacon itself from moisture and from the atmosphere, the wrapped bacon may be kept in good condition for a considerable extent of time.

The slab of wrapped and sliced bacon will reach the user as illustrated in Figures 5 and 6. When it is desired to remove some of the slices from the slab of bacon, the user may open one end, for example, the end 41 of the wrapper, and partially withdraw the slab of bacon from the wrapper. The desired number of slices may then be removed from the slab of bacon as by cutting the slices from the rind in the manner indicated at 42 in Figure 7, after which the rind may be removed by cutting therethrough, as indicated at 43 in Figure 8. This portion of the rind which is removed is useful in greasing pans, skillets, and the like to provide sufficient grease for cooking.

The removal of some of the slices from the slab of bacon in the manner above described does not separate the remaining portions of the slices on the slab, because the remaining slices of bacon have sufficient tenacity or adhesiveness, due to the greases and juices contained therein, to prevent unintentional separation. Therefore, the remaining slices on the slab of bacon can be pushed back into the wrapper and the wrapper instantly reclosed. If the original wrapper should be torn in the first handling or opening thereof, the remaining slices of bacon on the slab may be handled as a unit while being enclosed in a new wrapper. It is the partial cutting of the slab of bacon down to the rind only that first facilitates the wrapping of the slab of bacon, as well as protecting the slices from the atmosphere, and then enables the user to remove some slices without disarranging others.

I have shown and described my device as being particularly adapted for slicing bacon, but it will also be apparent that the device will work in like manner for slicing other meats. In cases of other meats not having a rind, due to the particular disposition of the knife with respect to the meat being sliced and to table 10, the knife will make cuts or incisions in the meat which will not extend entirely through the bottom thereof, so that the separate individual slices of meat will be kept together by a small, uncut portion at the bottom thereof.

Although I have shown and described a certain specific embodiment of my invention, I am fully aware that many modifications thereof are possible. My invention, therefore, is not to be restricted except insofar as is necessitated by the prior art and by the spirit of the appended claim.

What is claimed is:

A machine for slicing a slab of bacon comprising, in combination, a base, a knife mounted for rotation on said base about a horizontal axis, means for rotating said knife, a flat table for carrying the slab of bacon with the rind in engagement therewith, said table being mounted on said base for reciprocation in a horizontal plane to bring the slab of bacon into cutting engagement with said knife, the top surface of said table being disposed in a plane slightly below the lowermost part of said knife to cause a slice of the bacon to be severed substantially only to the rind, thereby permitting the slab of bacon to remain as a single unitary structure with the slices joined at their lower edges by the rind, the end of said table adjacent said knife being disposed in a plane spaced slightly back from the cutting plane thereof, means for reciprocating said table, means for holding the slab of bacon on said table and advancing it toward said knife in a step-by-step fashion to permit successive slices to be cut, and a receiving tray reciprocative with said table onto which the slab of bacon as sliced by said knife may be positioned, the upper surface of said receiving tray constituting a continuation of the upper surface of said table and being inclined downwardly relative thereto for permitting the successive slices to fall away from said knife as they are cut to reform the slab of bacon thereon in substantially its original shape with the rind remaining unsevered.

ARTHUR SEARS.